Patented Nov. 5, 1935

2,019,980

UNITED STATES PATENT OFFICE 2,019,980

METHOD AND COMPOSITION FOR PRODUCING A COLD GLAZE HAVING A DISPERSING AGENT THEREIN

Victor P. Krauss, Flushing, N. Y., assignor to American Kerament Corporation, New York, N. Y., a corporation of Delaware No Drawing. Application March 5, 1932, Serial No. 597,094

8 Claims. (Cl. 91—68)

The present invention relates to a glazing composition and method of making, and more particularly to a composition and process for glazing building materials and the like without the application of high temperatures.

In general, it is desirable to glaze building materials, such as bricks, tile, terra cotta, building blocks, cement articles, and other products, to provide a glossy surface and to give an attractive appearance thereto. One way of obtaining the glaze is to subject the coated building materials to high temperatures in kilns, to vitrify the coating. The most serious objection to this method is the cost of firing the articles. Cold processes, in which the glaze is obtained without firing, have been developed, but these have not been entirely satisfactory. Difficulties are encountered due to the fact that the material used in such glazes is not of satisfactory purity and texture, and has a tendency to form agglomerates, which results in a glaze coating wherein the particles are not uniformly distributed to produce a smooth, homogeneous surface.

The present invention aims to overcome the above objections and disadvantages by providing an improved glazing composition and cold process for applying the composition, to form a more glossy and attractive surface having characteristics of hardness, durability, and resistance to moisture and weathering. The glaze coating described herein is particularly applicable to building materials having a cement base, but can be applied to other construction materials, and the like, to accomplish advantageous results.

An object of the present invention is to provide a less expensive composition and process for glazing building materials and the like.

Another object of the present invention is to provide a glaze coating having a greater gloss.

Another object of the invention is to provide a glazing composition having a dispersing agent therein adapted to insure uniform distribution of the particles and to prevent the formation of irregularities in the glaze.

Another object of the invention is to provide an improved process of cold glazing, wherein the necessity of firing or the application of heat at high temperatures is eliminated.

A further object of the invention consists in simplifying the process for manufacturing the glazing composition and applying the same to building materials and the like, whereby the foregoing objects and advantages will be attained.

Other and further objects of the invention will be obvious upon an understanding of the illustrative embodiment about to be described; and many advantages other than those referred to herein will occur to one skilled in the art upon employment of the invention in practice.

In accomplishing the above enumerated objects, I prefer to combine a metallic soap with a dispersing agent containing an ammonium salt of an organic acid, and then mixing the resulting product with pulverized cement materials, and secondary substances such as coloring materials, pigments, crystalline, amorphous, and wholly or partly colloidal silica and siliceous compounds, and inorganic substances practically insoluble in water, and not directly reacting with the cement components of the glaze. I have found that the hardening and setting of this glaze mixture is primarily due to reactions with, and in the presence of the water, which is facilitated by thorough wetting of the particles. The dispersing agent facilitates faster and better surface wetting of the particles, whereby the reactions are more rapid and complete, to provide a better glaze coating. This applies not only to the active primary materials, namely, the cement, but also to the secondary substances mixed therewith.

For example, I have found that a calcium soap gives very satisfactory results, since it can be manufactured without difficulty and at a low cost and reacts favorably in the presence of dispersing agents, which will be described hereinafter. Calcium soap may be made in the conventional manner, by saponifying stearic acid or other fatty acid, with caustic alkali, and adding a calcium salt to the soap solution whereby the calcium radical will displace the alkali radical of the soap. This reaction is known as double decomposition, and the products thereof are a calcium soap and a salt of the alkali metal. For example, the calcium soap may be made by saponifying the stearic acid with sodium hydroxide and then adding, in solution, the proper quantity of calcium chloride, or other calcium salt, thereto. The resulting sodium chloride is thereafter separated from the calcium soap by washing. Preferably, the precipitation of the calcium soap is carried out in the presence of a dispersing agent, whereby the texture of the metallic soap will be greatly improved, and the particles will be finer and of more uniform size.

I have found, in addition to stearates, compounds of other fatty acids, especially palmitates and oleates, can be used satisfactorily, either separately or as mixtures. They may be combined with any of the metals which form compounds with fatty acids, commonly designated as soaps, which are practically insoluble in water. For general manufacturing purposes, where availability and cost are important factors, salts of aluminum, barium, iron, magnesium, zinc and the like are also suitable for this process. Mixtures, both as to the metals and the acids as single compounds, may be used for the process, and the mixtures may be either made in one continuous batch operation or by blending after formation of the single compounds.

I have discovered that certain ammonium compounds of organic acids are particularly adapted to be utilized as dispersing agents. The primary function of the dispersing agents is to improve the quality of the glaze by effecting homogeneous distribution and greater dispersion of the particles therein. In addition, the dispersing agent also acts as a catalyst in the presence of the soaps, to improve their reactions both in formation and combination with the other substances during the hardening of the glaze. As a dispersing agent, I prefer to use the ammonium compounds of organic acids such as tannic, gallic, oleic, stearic, linolic, and the like, with a small excess of ammonia added thereto. Various commercial extracts of vegetable origin, which contain relatively large amounts of organic acid, such as catechu or cutch, sumac, oak bark, and the like, are suitable for this purpose.

The coloring materials best adapted for the present process are chiefly inorganic compounds, such as the oxides and hydrated oxides of metals, and other metallic compounds, and refined natural earth pigments. Organic colors can also be used, but care must be taken in selecting these as to type, manipulation, and reaction upon exposure. A large variety of colors is available, since firing of the glaze is eliminated and color changes at high temperatures are obviated.

The following is an example of a preferred procedure for manufacturing the glazing composition described above. The exact quantities of the ingredients vary according to the specific substances selected, and can be readily determined from generally known and available data.

The fatty acid is first saponified with caustic alkali in the conventional manner, and water is added to bring the concentration to between five and eight per cent, and one-quarter to two per cent of dispersing substance is mixed therewith. Precipitation is then carried on with a solution of a metallic salt, such as the chloride or sulphate of the metal selected. The insoluble soap which is precipitated is in a light, finely divided form, due to the dispersing agent, and is, thereafter, washed with water four or five times, by decantation or other means excluding compacting thereof into a pasty mass, till practically all the soluble salts have been removed. In this manner, pasty agglomerates can be avoided and satisfactory soap particles are attained by carrying on the precipitation in dilute solutions and in the presence of a dispersing agent.

I have also found that the addition of the dispersing agent, either to the alkali soap before precipitation, when making the metallic soap, such as calcium stearate, or to the finished mixing liquid, produces a smoother glaze slurry with the desired greater dispersion of the cement particles, secondary substances and metallic soap. I prefer to add a small amount, usually one-quarter to one-half of one per cent of dispersing substance, to the finished liquid compound. Passing the finished mixing liquid through a colloid mill is beneficial, to provide a homogeneous mass, especially when the dispersing agent is added after precipitation.

To form the glaze vehicle, or mixing liquid, the requisite volume of water is added, so that the liquid contains one to two per cent of dispersed solids by weight. This liquid is then used in mixing the combination of pulverized cement material and secondary substances to produce a medium slurry or glaze compound which may vary in consistency, according to the operating conditions under which it is to be applied.

The following is an example of a mixture for producing a red glaze. Ten parts by volume of Portland cement, or a mixture of cement and pulverized quartz in ratio of two to one, or one to one, respectively, one part of ferric oxide, and five parts of mixing liquid, namely, soap and dispersing agent, are thoroughly mixed by mechanical means and are thereafter passed through a fine mesh screen to assure freedom from lumps or foreign matter. It will be understood that the proportions and procedure given foregoing, may be substantially varied and should not be taken as confining the invention to specific quantities and method noted.

The glaze is now ready for application to the product or article, which, for example, may be cement tile, building blocks, or other suitable materials. This may be accomplished by brushing, dipping or spraying the glaze thereon until the desired coating is effected. The glazed objects may be trimmed and then placed in a curing chamber which is kept moist for several days. In order to get best results, the tiles are thereafter placed in storage for a week or longer, to age or cure, until the permanent hardening or setting of the glaze is completed.

It will be seen that the present invention provides a simple, inexpensive composition for glazing, and a convenient process for manufacturing and applying the same on building materials. The dispersing compounds insure homogeneous distribution of the particles, preventing clots and irregularities in the glaze. The materials utilized herein are readily available at a minimum cost, and the several reactions involved are simple and can be practiced without complicated or expensive apparatus. Furthermore, the glaze can be made in most any desirable shade or color.

As various changes may be made in the proportions of the ingredients and in the procedure enumerated above, and as various equivalents may be substituted for those named above, and other methods may be utilized without departing from the spirit of the present invention, it is desired that the above description be understood as illustrative and not in a limiting sense.

Having thus described my invention, I claim:

1. The method of producing a glaze coating on building materials and the like without the use of high temperatures, which method comprises, mixing pulverized cement material with an aqueous dispersion of a soap practically insoluble in water and precipitated in the presence of and contaning a soluble ammoniacal salt of tannic acid and a small excess of ammonia, and coating the building material with said mixture.

2. As an article of manufacture, a building material coated with a cold glaze, comprising cement material, silica, a soap substantially insoluble in water, and ammonium tannate adapted to facilitate dispersion of the particles of the glaze.

3. A glazing composition comprising about ten parts by volume of pulverized cement and quartz, and about five parts by volume of an aqueous mixing solution having metallic soap practically insoluble in water and an ammoniacal salt of tannic acid dispersed therein.

4. A glazing composition for producing a cold glaze comprising pulverized cement material, and an aqueous dispersion of calcium soap precipitated in the presence of and containing an ammoniacal salt of tannic acid, and an excess of ammonia to provide a slurry free from irregularities.

5. A glazing composition comprising cement material, and a soap practically insoluble in water and containing ammonium tannate adapted to disperse the particles of the glaze to eliminate clots and irregularities.

6. As an article of manufacture, a building material coated with a cold glaze, comprising cement material, a metallic soap practically insoluble in water and ammonium tannate adapted to facilitate dispersion of the particles of the glaze.

7. The method of producing a glaze coating on building materials and the like without the use of high temperatures, which method comprises, mixing pulverized cement material with an aqueous dispersion of a soap practically insoluble in water and precipitated in the presence of and containing a soluble ammoniacal salt of tannic acid, and coating the building material with said mixture.

8. The method of producing a glaze coating on building materials and the like without the use of high temperatures, which method comprises, mixing pulverized cement and siliceous material with an aqueous dispersion of a metallic soap precipitated in the presence of and containing ammonium tannate, and coating the building with said mixture.

VICTOR P. KRAUSS.